(12) United States Patent
Raman et al.

(10) Patent No.: US 9,438,555 B2
(45) Date of Patent: Sep. 6, 2016

(54) COMMUNICATING WITH A DISTRIBUTION SYSTEM VIA AN UPLINK ACCESS POINT

(71) Applicant: Aruba Networks, Inc., Sunnyvale, CA (US)

(72) Inventors: Gopalakrishna Raman, Santa Clara, CA (US); Santashil PalChaudhuri, Kolkata (IN)

(73) Assignee: Aruba Networks, Inc., Sunnyvale, CA (US)

( * ) Notice: Subject to any disclaimer, the term of this patent is extended or adjusted under 35 U.S.C. 154(b) by 139 days.

(21) Appl. No.: 14/069,105

(22) Filed: Oct. 31, 2013

(65) Prior Publication Data

US 2015/0117420 A1 Apr. 30, 2015

(51) Int. Cl.
*H04L 29/12* (2006.01)

(52) U.S. Cl.
CPC ......... *H04L 61/103* (2013.01); *H04L 61/2015* (2013.01); *H04L 61/6009* (2013.01)

(58) Field of Classification Search
None
See application file for complete search history.

(56) References Cited

U.S. PATENT DOCUMENTS

| | | | |
|---|---|---|---|
| 2008/0065747 A1* | 3/2008 | Kubota | H04L 29/1282 709/220 |
| 2009/0119407 A1* | 5/2009 | Krishnan | H04L 63/0281 709/228 |
| 2010/0281159 A1* | 11/2010 | Boscolo | H04L 63/20 709/224 |
| 2013/0097674 A1* | 4/2013 | Jindal | G06F 15/16 726/4 |
| 2015/0113168 A1* | 4/2015 | Xu | H04N 21/44227 709/245 |

* cited by examiner

*Primary Examiner* — Marcus R Smith

(57) ABSTRACT

The present disclosure discloses a system and method for communicating with a distribution system via an uplink access point. The system includes a processor and a memory storing instructions that, when executed, cause the system to: receive, at a first network device, an original packet from a client device; identify a source MAC address of the original packet as a MAC address of the client device; identify an IP address of the original packet as an IP address of the client device; generate a modified packet from the original packet by changing the source MAC address from the MAC address of the client device to a MAC address of the first network device; preserve the IP address in the modified packet to be the IP address of the client device; and forward the modified packet from the first network device to a second network device.

15 Claims, 15 Drawing Sheets

900

Service Client Entry

| Client Device's MAC Address | Encryption Key | Client Device's IP Address |
|---|---|---|

DHCP State Entry

| Originator-XID | Generated-XID | Broadcast Bit of Original DHCP Discover or Request Message |
|---|---|---|

FIG. 9B

COMMUNICATING WITH A DISTRIBUTION SYSTEM VIA AN UPLINK ACCESS POINT

FIELD

The present disclosure relates to communicating with distribution systems. In particular, the present disclosure relates to a system and method for handling data communication between client devices and distribution systems via access points.

BACKGROUND

In the IEEE 802.11 standard, an access point (AP) can be connected to a distribution system (DS) via a wired Ethernet connection. In some scenarios, some access points may not have wired Ethernet connection to a distribution system and may use a wireless DS link to connect to the distribution system. However, the implementation of the wireless DS link requires the use of a 4-address IEEE 802.11 frame format that is not supported by a majority of deployed access points.

BRIEF DESCRIPTION OF THE DRAWINGS

The present disclosure may be best understood by referring to the following description and accompanying drawings that are used to illustrate embodiments of the present disclosure.

FIG. 9A is a graphic representation illustrating an exemplary service client entry associated with a client device.

FIG. 9B is a graphic representation illustrating an exemplary DHCP state entry associated with a client device.

DETAILED DESCRIPTION

Figure 1:
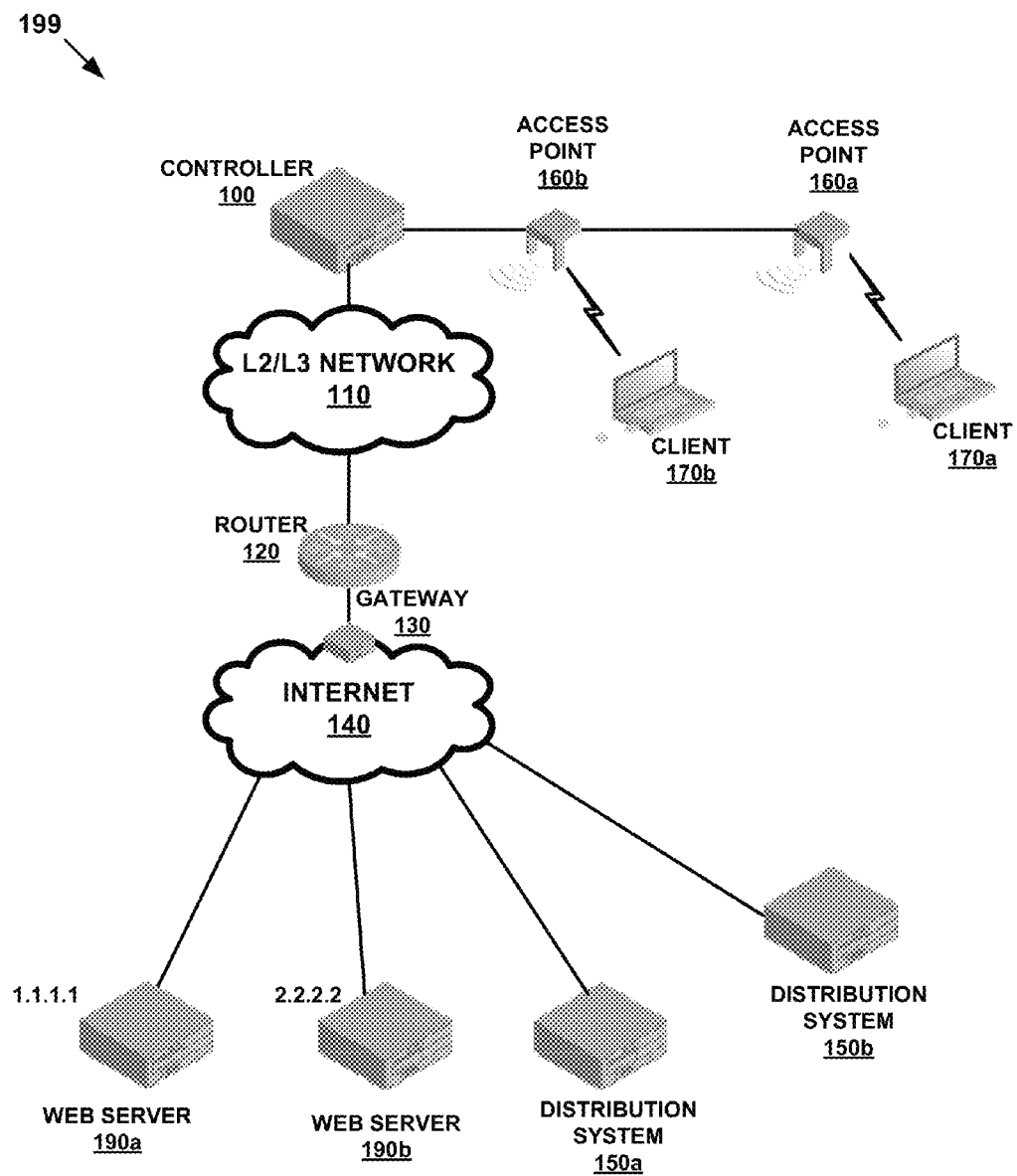
FIG. 1 is a block diagram illustrating an exemplary network environment according to embodiments of the present disclosure.

In the following description, several specific details are presented to provide a thorough understanding. While the context of the disclosure is directed to handling communication between client devices and distribution systems using access points, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

Embodiments of the present disclosure relate to communicating with distribution systems. In particular, the present disclosure relates to a system and method for handling communication between client devices and distribution systems via access points. Specifically, the system achieves benefits similar to those provided by a wireless DS link without using a 4-address IEEE 802.11 frame format that is required in the wireless DS link. Instead, the system associates a first access point that has no Ethernet connection to a distribution system with an uplink access point using an IEEE 802.11 standard wireless link. The uplink access point has Ethernet connection to the distribution system, and the first access point and the distribution system can communicate with each other via the uplink access point. The system supports Internet Protocol (IP) clients and can be extended to support other protocols such as IPv6.

According to embodiments of the present disclosure, the first access point receives packets from its clients and applies selective transformations on the packets before forwarding the packets to the uplink access point. The first access point can provide a Layer 2 (L2) link to its clients. However, the first access point does not expose the media access control (MAC) address of any client, because the first access point uses its own MAC address as the source MAC address to forward the packets to the uplink access point, causing the uplink access point to relay the packets to the distribution system. The first access point also acts as an address resolution protocol (ARP) proxy for all its clients so that stations (such as host devices) in the distribution systems can send and receive data traffic to and from the clients of the first access point.

In some embodiments, the first access point receives an original packet from a client device. The first access point identifies a source MAC address of the original packet as a MAC address of the client device and identifies a source IP address in the original packet as an IP address of the client device. The first access point generates a modified packet from the original packet by changing the source MAC address from the MAC address of the client device to a MAC address of the first network device. The first access point preserves the source IP address in the modified packet to be the IP address of the client device. The first access point forwards the modified packet to an uplink access point, which forwards the modified packet to the distribution system.

In some embodiments, the first access point receives an original DHCP discover message from a client device. The first access point identifies a first transaction ID in the original DHCP discover message. The first access point generates a second transaction ID. The first access point generates a modified DHCP discover message from the original DHCP discover message by: replacing the first transaction ID in the original DHCP discover message with the second transaction ID; and setting a broadcast bit of the modified DHCP discover message to a broadcast state. The first access point forwards the modified DHCP discover message to an uplink access point, which forwards the modified DHCP discover message to the distribution system.

Computing Environment

FIG. 1 shows an exemplary digital network environment 199 according to embodiments of the present disclosure. FIG. 1 includes at least one or more network controller (such as controller 100), one or more access points (such as access points 160a, 160b), one or more client devices (such as clients 170a, 170b), a layer 2 or layer 3 network (such as L2/L3 network 110), a routing device (such as router 120), a gateway 130, Internet 140, one or more web servers (such as web servers 190a, 190b) and one or more distribution systems (such as distribution systems 150a, 150b), etc. The components of the digital network environment 199 are communicatively coupled to each other. In some embodiments, the digital network environment 199 may include other components not shown in FIG. 1 such as an email server, a cloud-based storage device, etc. In FIG. 1 and the remaining figures, a letter after a reference number, e.g., "160a," represents a reference to the element having that particular reference number. A reference number in the text without a following letter, e.g., "160," represents a general reference to implementations of the element bearing that reference number.

The controller 100 is a hardware device and/or software module that provide network managements, which include but are not limited to, controlling, planning, allocating, deploying, coordinating, and monitoring the resources of a network, network planning, frequency allocation, predetermined traffic routing to support load balancing, cryptographic key distribution authorization, configuration management, fault management, security management, performance management, bandwidth management, route analytics and accounting management, etc.

Moreover, assuming that a number of access points 160 are interconnected with the network controller 100. Each access point 160 may be interconnected with zero or more client devices via either a wired interface or a wireless interface. In this example, for illustration purposes only, assuming that the client 170a is associated with the access point 160a via a wireless link and the client 170b is associated with the access point 160b via a wireless link. An access point 160 generally refers to a network device that allows wireless clients to connect to a wired network. Access points 160 usually connect to a controller 100 via a wired network or can be a part of a controller 100 in itself. In some examples, an access point 160 can be connected to another access point 160. For example, the access point 160a is connected to the access point 160b.

In some embodiments, the access point 160b has a wired Ethernet connection to a distribution system (DS) 150 while the access point 160a does not have any Ethernet connection to the distribution system 150. The access point 160a connects to the access point 160b as a client. For example, the access point 160a connects to the access point 160b using an IEEE 802.11 standard wireless link. The access point 160b that has the Ethernet connection can be referred to as an uplink access point for the access point 160a, and serves the access point 160a and other clients such as the client 170b. The access point 160a can communicate with the distribution system 150 via the uplink access point 160b as described below in more detail.

Furthermore, the controller 100 can be connected to the router 120 through zero or more hops in a layer 3 or layer 2 network (such as L2/L3 Network 110). The router 120 can forward traffic to and receive traffic from the Internet 140. The router 120 generally is a network device that forwards data packets between different networks, and thus creating an overlay internetwork. A router 120 is typically connected to two or more data lines from different networks. When a data packet comes in one of the data lines, the router 120 reads the address information in the packet to determine its destination. Then, using information in its routing table or routing policy, the router 120 directs the packet to the next/different network. A packet is typically forwarded from one router 120 to another router 120 through the Internet 140 until the packet gets to its destination.

The gateway 130 is a network device that passes network traffic from local subnet to devices on other subnets. In some embodiments, the gateway 130 may be connected to a controller 100 or be a part of the controller 100 depending on the configuration of the controller 100.

The distribution systems 150a, 150b are hardware devices and/or software modules that manage network resource in the digital network environment 199. For example, the distribution systems 150a, 150b can be dynamic host configuration protocol (DHCP) servers such as Internet System Consortium (ISC) servers that can configure and distribute Internet Protocol (IP) addresses for different network devices and/or client devices 170. The distribution system 150a, 150b may also exchange data packets with different client devices 170. In some embodiments, the distribution systems 150a, 150b are in the same local area network (LAN) as the access point 160b. The distribution systems 150a, 150b may connect to the access point 160b directly via Ethernet connection. Each distribution system 150 may include one or more host devices (not shown). Although two distribution systems 150a, 150b are illustrated, FIG. 1 may include one or more distribution systems 150.

Web servers 190a, 190b are hardware devices and/or software modules that facilitate delivery of web content that can be accessed through the Internet 140. For example, the web server 190a may be assigned an IP address of 1.1.1.1 and used to host a first Internet website (e.g., www.yahoo.com); and the web server 190b may be assigned an IP address of 2.2.2.2 and used to host a second Internet website (e.g., www.google.com). Although two web servers 190a, 190b are illustrated, FIG. 1 may include one or more web servers 190.

The client 170 may be a computing device that includes a memory and a processor, for example a laptop computer, a desktop computer, a tablet computer, a mobile telephone, a personal digital assistant (PDA), a mobile email device, a portable game player, a portable music player, a reader device, a television with one or more processors embedded therein or coupled thereto or other electronic device capable of accessing a network. Although only one client 170 is connected to one access point 160 in FIG. 1, a plurality of clients 170 can be connected to each access point 160.

Network Device for Handling Data Communication

Figure 2A:
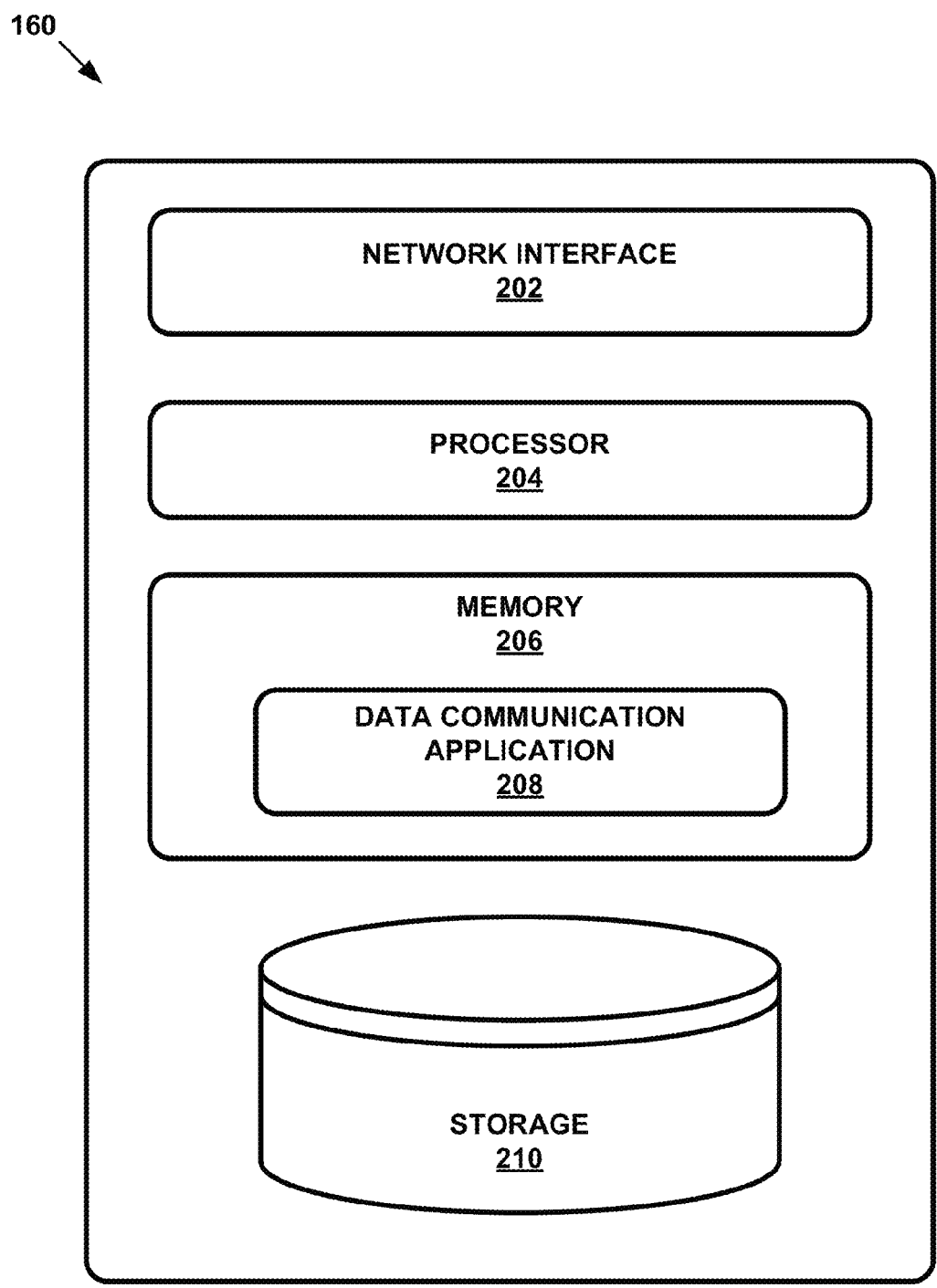
FIG. 2A is a block diagram illustrating an exemplary network device according to embodiments of the present disclosure.

FIG. 2A is a block diagram illustrating an example network device system for handling communication between distribution systems 150 and client devices 170 according to embodiments of the present disclosure. In some embodiments, the example network device is an access point 160 that does not have Ethernet connection to a distribution system 150. The access point 160 connects to an uplink access point 160 as a client, where the uplink access point 160 has Ethernet connection to the distribution system 150. The access point 160 can communicate with the distribution system 150 via the uplink access point 160.

It should be understood that, in other embodiments, the network device may be one of a network switch, a network router, a network controller, a network gateway, a network server, etc. Further, the network device may serve as a node in a distributed or a cloud computing environment. According to embodiments of the present disclosure, network services provided by a network device, solely or in combination with other wireless network devices, include, but are not limited to, an Institute of Electrical and Electronics Engineers (IEEE) 802.1x authentication to an internal and/or external Remote Authentication Dial-In User Service (RADIUS) server; an MAC authentication to an internal and/or external RADIUS server; a built-in Dynamic Host Configuration Protocol (DHCP) service to assign wireless client devices IP addresses; an internal secured management interface; Layer-3 forwarding; Network Address Translation (NAT) service between the wireless network and a wired network coupled to the network device; an internal and/or external captive portal; an external management system for managing the network devices in the wireless network; etc.

In some embodiments, the access point 160 includes a network interface 202 capable of communicating to another access point 160 and/or a wired network, a processor 204, a memory 206 and a storage device 210. The components of the access point 160 are communicatively coupled to each other.

The network interface 202 can be any communication interface, which includes but is not limited to, a modem, token ring interface, Ethernet interface, wireless IEEE 802.11 interface (e.g., IEEE 802.11n, IEEE 802.11ac, etc.), cellular wireless interface, satellite transmission interface, or any other interface for coupling network devices. In some embodiments, the network interface 202 may be software-defined and programmable, for example, via an Application Programming Interface (API), and thus allowing for remote control of the network device.

The processor 204 includes an arithmetic logic unit, a microprocessor, a general purpose controller or some other processor array to perform computations and provide electronic display signals to a display device. Processor 204 processes data signals and may include various computing architectures including a complex instruction set computer (CISC) architecture, a reduced instruction set computer (RISC) architecture, or an architecture implementing a combination of instruction sets. Although FIG. 2 includes a single processor 204, multiple processors 204 may be included. Other processors, operating systems, sensors, displays and physical configurations are possible. In some embodiments, the processor 204 includes a networking processor core that is capable of processing network data traffic.

The memory 206 stores instructions and/or data that may be executed by the processor 204. The instructions and/or data may include code for performing the techniques described herein. The memory 206 may be a dynamic random access memory (DRAM) device, a static random access memory (SRAM) device, flash memory or some other memory device. In some embodiments, the memory 206 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the memory 206 stores a data communication application 208. The data communication application 208 can be code and routines for handling communication between distribution systems 150 and client devices 170. In some embodiments, the data communication application 208 can be implemented using hardware including a field-programmable gate array (FPGA) or an application-specific integrated circuit (ASIC). In some other embodiments, the data communication application 208 can be implemented using a combination of hardware and software. In some embodiments, the data communication application 208 may be stored in a combination of the network devices, or in one of the network devices. The data communication application 208 is described below in more detail with reference to FIGS. 2B-8.

The storage device 210 can be a non-transitory memory that stores data for providing the functionality described herein. The storage device 210 may be a dynamic random access memory (DRAM) device, a static random access memory (SRAM) device, flash memory or some other memory devices. In some embodiments, the storage device 210 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

Example Data Communication Application

Figure 2B:
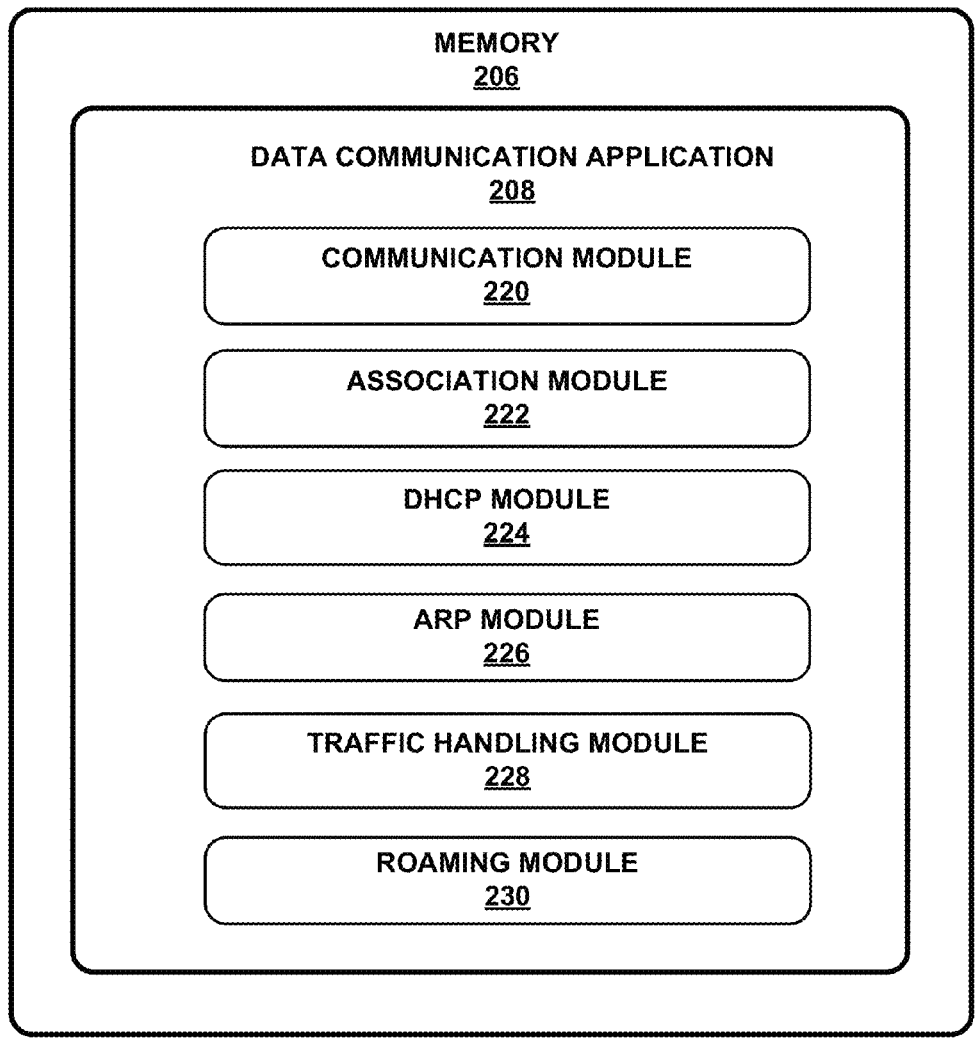
FIG. 2B is a block diagram illustrating a memory storing an exemplary data communication application according to embodiments of the present disclosure.

FIG. 2B illustrates an exemplary data communication application 208 stored on a memory 206 according to embodiments of the present disclosure. In some embodiments, the data communication application 208 includes a communication module 220, an association module 222, a dynamic host configuration protocol (DHCP) module 224, an address resolution protocol (ARP) module 226, a traffic handling module 228 and a roaming module 230. The components of the data communication application 208 are communicatively coupled to each other. In some embodiments, each module of the data communication application 208 can be a set of instructions executable by the processor 204 to provide the functionality described herein. In some other embodiments, each module of the data communication application 208 can be stored in the memory 206 of the access point 160 and can be accessible and executable by the processor 204. Each module of the data communication application 208 may be adapted for cooperation and communication with the processor 204 and other components of the access point 160 such as the network interface 202, the storage 210, etc.

The communication module 220 can be software including routines for handling communication between the data communication application 208 and other components in the digital computing environment 199. In some embodiments, the communication module 220 sends and receives data to and from one or more of a client 170, an uplink access point 160 and other network devices via the network interface 202. For example, the communication module 220 receives packets from a client 170 via the network interface 202, and forwards the received packets to the DHCP module 224 or the traffic handling module 228. In another example, the communication module 220 receives data describing a modified DHCP discover message from the DHCP module 224 and sends the modified DHCP discover message to an uplink access point 160 via the network interface 202. In some embodiments, the communication module 220 handles communication between components of the data communication application 208.

In some embodiments, the communication module 220 receives data from components of the data communication application 208 and stores the data in the storage device 210.

For example, the communication module 220 receives data describing a service client entry associated with a client device 170 from the association module 222, and stores the service client entry in the storage device 210. The service client entry is described below in more detail. In some embodiments, the communication module 220 retrieves data from the storage device 210, and sends the data to components of the data communication application 208. For example, the communication module 220 retrieves data describing a DHCP state entry from the storage device 210, and sends the DHCP state entry to the DHCP module 224. The DHCP state entry is described below in more detail.

The association module 222 can be software including routines for establishing an association between the access point 160 and an uplink access point 160 and/or associations between the access point 160 and its clients 170. In some embodiments, the association module 222 establishes a link between the access point 160 and an uplink access point 160. For example, the association module 222 associates the access point 160 to the uplink access point 160 using an uplink radio of the access point 160, so that the access point 160 acts as a client (such as a standard IEEE 802.11 client) of the uplink access point 160. The access point 160 obtains an IP address as a standard client of the uplink access point 160.

In some embodiments, the access point 160 may have two radios in two different frequency bands. For example, the access point 160 has an uplink radio for associating with the uplink access point 160 and a service radio for serving its own clients 170. An uplink radio of the access point 160 can be a radio for setting up a link (such as an IEEE 802.11 wireless link) with the uplink access point 160. A service radio of the access point 160 can be a radio for setting up links (such as IEEE 802.11 wireless links) with clients 170 of the access point 160. In some other embodiments, the uplink radio and the service radio can be the same radio in the same frequency band.

In some embodiments, the association module 222 uses the service radio to establish links between the access point 160 and clients 170 of the access point 160. For example, after establishing the uplink association between the access point 160 and the uplink access point 160, the association module 222 can instruct the access point 160 to transmit periodic signals (such as beaconing signals) on the service radio indicating the access point 160 is ready to accept clients on the service radio. After receiving the signals from the access point 160, client devices 170 can associate to the service radio of the access point 160 and become clients of the access point 160.

The association module 222 generates a service client entry for each client device 170 that associates with the access point 160, and adds the service client entry to a station table associated with the access point 160. The station table can be a table for storing data associated with the access point 160. In some embodiments, data in the station table can be stored in other formats (e.g., a tree format, a graph format, etc.) rather than a tabular format. A service client entry associated with a client device 170 may include one or more items associated with the client device 170. For example, a service client entry includes a hardware address such as a media access control (MAC) address of an associated client device 170, encryption keys negotiated between the client device 170 and the access point 160, and/or an IP address for the client device 170, etc. An example service client entry is illustrated with reference to FIG. 9A. The IP address for the client device 170 is initially blank until a unique IP address is allocated to the client device 170. The configuration of an IP address for a client device 170 associated with the access point 160 is described below in more detail.

The DHCP module 224 can be software including routines for processing DHCP messages. Example DHCP messages include DHCP discover messages, DHCP offer messages, DHCP request messages and DHCP acknowledgement (ACK) messages, etc. In some embodiments, the DHCP module 224 receives a DHCP discover message from a client device 170 that is associated with the access point 160. The DHCP discover message received from a client device 170 can be referred as an original DHCP discover message. The DHCP module 224 identifies a transaction ID (e.g., an XID) from the original DHCP discover message. The transaction ID in the original DHCP discover message can be referred to as an originator-XID. The DHCP module 224 generates a new transaction ID for the DHCP discover message, which can be referred to as a generated-XID. In some examples, the generated-XID has a one-to-one correspondence with the originator-XID.

The DHCP module 224 creates a DHCP state entry for the client device 107. The DHCP state entry for the client device 170 may include one or more of an originator-XID field for storing the originator-XID, a generated-XID field for storing the generated-XID and/or a broadcast field for storing a broadcast bit (e.g., Bit 0 of the "flags" field) of the original DHCP discover message, etc. The DHCP state entry may include the MAC address of the client device 170 that serves as a client ID to identify the client device 170 associated with the DHCP state entry.

After receiving the original DHCP discover message from the client device 170, the DHCP module 224 stores the broadcast bit of the original DHCP discover message in the broadcast field of the DHCP state entry. The DHCP module 224 modifies the original DHCP discover message to generate a modified DHCP discover message by: (1) replacing the originator-XID in the original DHCP discover message with the generated-XID; and (2) setting the broadcast bit (e.g., Bit 0 of the "flags" field) to the broadcast state. The broadcast state of the broadcast bit in the modified DHCP discover message can cause the distribution system 150 to broadcast a message (e.g., a DHCP offer message) replying to the modified DHCP discover message in the network. The modified DHCP discover message includes a client ID for identifying the client device 170. For example, the "chaddr" field in the modified DHCP discover message includes the MAC address of the client device 170, which can serve as a client ID for identifying the client device 170.

The DHCP module 224 forwards the modified DHCP discover message to the uplink access point 160, causing the uplink access point 160 to relay the modified DHCP discover message to a distribution system 150 via the Ethernet connection. For example, the uplink access point 160 forwards the modified DHCP discover message to the distribution system 150 as an Ethernet frame. The source address of the frame is the MAC address of the access point 160 rather than the MAC address of the client device 170.

The distribution system 150 receives the modified DHCP discover message from the uplink access point 160, and generates a DHCP offer message that replies to the modified DHCP discover message. The distribution system 150 sends the DHCP offer message as a broadcast packet because the broadcast bit in the "flags" field of the modified DHCP discover message is set to the broadcast state. The DHCP offer message generated by the distribution system 150 can be referred to as an original DHCP offer message. The uplink access point 160 receives the original DHCP offer message from the distribution system 150 as a broadcast message, and relays the original DHCP offer message to all the clients of the uplink access point 160 including the access point 160.

The DHCP module 224 stored on the access point 160 receives the original DHCP offer message from the uplink access point 160. The DHCP module 224 determines whether the original DHCP offer message is a reply message to any modified DHCP discover message generated by the DHCP module 224. For example, the DHCP module 224 extracts a transaction ID and a client ID (e.g., an address in the "chaddr" fields) from the original DHCP offer message. The DHCP module 204 determines whether there is a DHCP state entry in the station table of the access point 160 that has (1) a generated-XID matching the extracted transaction ID and (2) a client ID matching the extracted client ID. If there is no matching DHCP state entry (e.g., there is no generated-XID in the station table matching the extracted transaction ID and no client ID matching the extracted client ID), the DHCP module 224 discards the original DHCP offer message.

However, if there is a matching DHCP state entry (e.g., there is a DHCP state entry having (1) a generated-XID equal to the extracted XID and (2) a client's MAC address equal to the extracted client ID), the DHCP module 224 modifies the original DHCP offer message to generate a modified DHCP offer message by replacing the transaction ID in the original DHCP offer message with an originator-XID in the matching DHCP state entry. The modified DHCP offer message is a reply message for the original DHCP discover message that has the same originator-XID. The DHCP module 224 forwards the modified DHCP offer message to the client device 170 identified by the client ID. If the broadcast bit in the original DHCP discover message is set to the broadcast state, the DHCP module 224 sends the modified DHCP offer message as a broadcast packet. Otherwise, the DHCP module 224 sends the modified DHCP offer message as a unicast message to the client device 170.

The client device 170 receives the modified DHCP offer message from the access point 160, and generates a DHCP request message with a transaction ID to be the originator-XID. The client device 170 sends the DHCP request message to the access point 160. The DHCP module 224 stored in the access point 160 receives the DHCP request message from the client device 170. The DHCP request message originated from the client device 170 can be referred as an original DHCP request message. The DHCP module 224 identifies a transaction ID in the original DHCP request message as the originator-XID. The DHCP module 224 identifies a DHCP state entry associated with the client device 170 that has the same originator-XID as the original DHCP request message. The DHCP module 224 stores the broadcast bit (e.g., Bit 0 of the flags field) of the original DHCP request message in the broadcast field of the DHCP state entry.

The DHCP module 224 modifies the original DHCP request message to generate a modified DHCP request message by: (1) replacing the originator-XID in the original DHCP request message with the generated-XID in the DHCP state entry; and (2) setting the broadcast bit to the broadcast state. The broadcast state of the broadcast bit in the modified DHCP request message can cause the distribution system 150 to broadcast a message (e.g., a DHCP ACK message) that replies to the modified DHCP request message in the network. The modified DHCP request message includes a client ID for identifying the client device 170. For example, the "chaddr" field in the modified DHCP request message includes the MAC address of the client device 170, which can serve as a client ID for identifying the client device 170. The DHCP module 224 forwards the modified DHCP request message to the uplink access point 160, causing the uplink access point 160 to relay the modified DHCP request message to a distribution system 150 via the Ethernet connection. For example, the uplink access point 160 forwards the modified DHCP request message to the distribution system 150 as an Ethernet frame. The source address of the frame is the MAC address of the access point 160 rather than the MAC address of the client device 170.

The distribution system 150 receives the modified DHCP request message from the uplink access point 160, and generates a DHCP ACK message that replies to the modified DHCP request message. The distribution system 150 sends the DHCP ACK message as a broadcast packet because the broadcast bit in the "flags" field of the modified DHCP request message is set to the broadcast state. The DHCP ACK message generated by the distribution system 150 can be referred to as an original DHCP ACK message. The uplink access point 160 receives the original DHCP ACK message from the distribution system 150 as a broadcast message, and relays the original DHCP ACK message to all the clients of the uplink access point 160 including the access point 160.

The DHCP module 224 stored on the access point 160 receives the original DHCP ACK message from the uplink access point 160. The DHCP module 224 determines whether the original DHCP ACK message is a reply message to any modified DHCP request message generated by the DHCP module 224. For example, the DHCP module 224 extracts a transaction ID and a client ID (e.g., a MAC address in the "chaddr" fields) from the original DHCP ACK message, and determines whether there is a DHCP state entry in the station table of the access point 160 that includes (1) a generated-XID matching the extracted transaction ID and (2) a client ID matching the extracted client ID. If there is no matching DHCP state entry (e.g., there is no generated-XID matching the extracted transaction ID and no client ID matching the extracted client ID), the DHCP module 224 discards the original DHCP ACK message.

However, if there is a matching DHCP state entry (e.g., there is a DHCP state entry having (1) a generated-XID equal to the extracted XID and (2) a client's MAC address equal to the extracted client ID), the DHCP module 224 modifies the original DHCP ACK message to generate a modified DHCP ACK message by replacing the transaction ID in the original DHCP ACK message with an originator-XID in the matching DHCP state entry. The modified DHCP ACK message is a reply message for the original DHCP request message that has the same originator-XID. The DHCP module 224 forwards the modified DHCP ACK message to the client device 170 identified by the client ID. If the broadcast bit in the original DHCP request message is set to the broadcast state, the DHCP module 224 sends the modified DHCP ACK message as a broadcast packet. Otherwise, the DHCP module 224 sends the modified DHCP ACK message as a unicast message to the client device 170.

The client device 170 receives the modified DHCP ACK message, and updates its IP address as the IP address confirmed in the DHCP ACK message. The DHCP handshake process described herein allocates a unique IP address to the client device 170. The DHCP module 224 updates the IP address in the service client entry associated with the client device 170 as the unique IP address allocated to the client device 170.

The ARP module 226 can be software including routines for managing ARP operations for client devices 170 associated with the access point 160. In some embodiments, the ARP module 226 can perform proxy ARP functions for managing data traffic from the distribution system 150 to the client devices 170. For example, assume a host device in the distribution system 150 intends to send one or more packets to a client device 170, where the client device 170 is associated with the access point 160 and has been allocated with an IP address. The host device sends a broadcast ARP request across the network. The uplink access point 160 receives the broadcast ARP request and forwards the ARP request to the access point 160 as a broadcast packet. The ARP module 226 stored on the access point 160 determines whether a target IP address in the ARP request is associated with any client device 170 of the access point 160. For example, the ARP module 226 compares the target IP address with IP addresses stored in the service client entries, and determines whether the target IP address is an IP address of any client of the access point 160. If the target IP address is not associated with any client 170 of the access point 160, the ARP module 226 discards the ARP request. If the target IP address is associated with a client 170 of the access point 160 (e.g., the target IP address is the IP address allocated to the client 170), the ARP module 226 generates an ARP response that responds to the ARP request. The ARP response maps the IP address of the client device 170 to the MAC address of the access point 160, allowing packets sent to the IP address of the client device 170 to be uni-casted to the MAC address of the access point 160.

In some embodiments, the ARP module 226 can perform ARP forwarding from client devices 170 to the distribution system 150. For example, the ARP module 226 receives an ARP request from a client device 170 associated with the access point 160, and determines whether a target IP address included in the ARP request is associated with another client device 170 of the access point 160. If the target IP address is an IP address of another client device 170, the ARP module 226 broadcasts the ARP request on the service radio of the access point 160, allowing the other client device 170 associated with the target IP address to send an ARP response to the client device 170. The ARP response may map the target IP address to the other client device's MAC address.

If the target IP address is not associated with any client devices 170 of the access point 160, the ARP module 226 determines whether the target IP address is present in a DS-IP table. The DS-IP table stores IP-to-MAC mappings for host devices in the distribution system 150. For example, the DS-IP table stores one or more entries with each mapping a host device's IP address to the host device's MAC address. Initially, the DS-IP table is an empty table, and the ARP module 226 updates the DS-IP table responsive to receiving ARP responses from host devices in the distribution system 150. If the target IP address is present in the DS-IP table, the ARP module 226 generates an ARP response based on the DS-IP table. The ARP response maps the target IP address to a MAC address of a host device associated with the target IP address. The ARP module 226 sends the ARP response to the client device 170 that sends the ARP request.

If the target IP address is not present in the DS-IP table, the ARP module 226 generates a new ARP request including the target IP address and drops the original ARP request received from the client device 170. The ARP module 226 sends the new ARP request from the access point 160 to the uplink access point 160, causing the uplink access point 160 to forward or broadcast the ARP request to the distribution system 150. A host device in the distribution system 150 that is associated with the target IP address receives the new ARP request and generates an ARP response mapping the host device's IP address to the host device's MAC address. The host device sends the ARP response to the uplink access point 160 or broadcasts the ARP response in the network. The uplink access point 160 forwards the ARP response to the access point 160 or broadcasts the ARP response to all its clients including the access point 160. The ARP module 226 stored on the access point 160 receives the ARP response from the uplink access point 160, and updates the DS-IP table based on the ARP response. For example, the ARP module 226 adds an entry in the DS-IP table, where the entry describes the mapping between the host device's IP address and the host device's MAC address.

When the client device 170 re-transmits the ARP request including the target IP address to the access point 160, the ARP module 224 determines that the target IP address is now present in the updated DS-IP table. The ARP module 224 generates an ARP response mapping the target IP address to the host device's MAC address based on the updated DS-IP table, and sends the ARP response to the client device 170. In some embodiments, the ARP module 226 removes inactive entries or outdated entries in the DS-IP table and adds new entries to the DS-IP table.

The traffic handling module 228 can be software including routines for handling data traffic related to client devices 170 that are associated with the access point 160. For example, the traffic handling module 228 can handle uni-cast IP traffic and/or multi-cast traffic between client devices 170 and the distribution system 150 as described herein. In some embodiments, operations related to DHCP and ARP are implemented preceding the exchange of IP traffic. For example, the exchange of DHCP messages is performed prior to the exchange of IP traffic.

In some embodiments, the traffic handling module 228 receives a packet from a client 170 associated with the access point 160. The packet received from the client device 170 can be referred to as an original packet. The traffic handling module 228 identifies a source MAC address in the original packet as the MAC address of the client device 170. The traffic handling module 228 identifies a source IP address in the original packet as the IP address of the client device 170. The traffic handling module 228 modifies the original packet to generate a modified packet by changing the source MAC address from the MAC address of the client device 170 to the MAC address of the access point 160, so that the packet is treated as being originated from the access point 160. The traffic handling module 228 preserves the source IP address in the modified packet to be the IP address of the client device 170. In this case, the modified packet has a source MAC address as the MAC address of the access point 160 and a source IP address as the IP address of the client device 170. The traffic handing module 228 sends the modified packet to the uplink access point 160, causing the uplink access point 160 to forward the modified packet to a target IP address in the modified packet.

In some embodiments, a host device in the distribution system 150 intends to send a packet to an IP address of a client device 170 associated with the access point 160. The host device uni-casts the packet to the access point 160 because the IP address of the client device 170 is mapped to the MAC address of the access point 160. The traffic handling module 228 determines that a destination IP address in the packet is the IP address of the client device 170 and forwards the packet to the client device 170.

The roaming module 230 can be software including routines for managing roaming of client devices 170. In some embodiments, the roaming module 230 detects a removal of a client device 170 from the access point 160, and deactivates service for the client device 170 from the access point 160. For example, the roaming module 230 manages a time counter for each client device 170 associated with the access point 160. The time counter counts a time duration that the client device 170 is linked to the access point 160. If the time duration reaches a predetermined threshold, indicating the association between the client device 170 and the access point 160 expires, the roaming module 230 removes the association between the client device 170 and the access point 160. For example, the roaming module 230 invalidates the service client entry associated with the client device 170 from the station table, de-authenticates the client device 170 at the access point 160 and stops responding as an ARP proxy for the client device 170, etc.

In another example, the roaming module 230 monitors for DHCP discover messages and/or DHCP request messages that are (1) received from the uplink access point 160 via the uplink radio and (2) originated from client devices 170 associated with the access point 160. If the roaming module 230 receives, from the uplink access point 160 via the uplink radio, a DHCP discover message and/or a DHCP request message originated from a client device 170, the roaming module 230 determines that the client device 170 has roamed away from the access point 160. The roaming module 230 removes the association between the client device 170 and the access point 160. For example, the roaming module 230 invalidates and removes the service client entry associated with the client device 170 from the station table. In another example, the roaming module 230 de-authenticates the client device 170 at the access point 160 to avoid a potential denial of service (DOS) attack, where an attacker may cause the access point 160 to invalidate the service client entry of the client device 170 by injecting numerous fake DHCP discover messages and/or DHCP request messages in the network. In yet another example, the roaming module 230 stops responding as an ARP proxy for the client device 170.

Processes for Handling Data Communication

With reference to FIGS. 3-8 described below, in some embodiments the first network device can be an access point 160 that does not have Ethernet connection to the distribution system 150. The first network device connects to a second network device that has Ethernet connection to the distribution system 150. The second network device can be an uplink network device such as an uplink access point 160.

Figure 3:
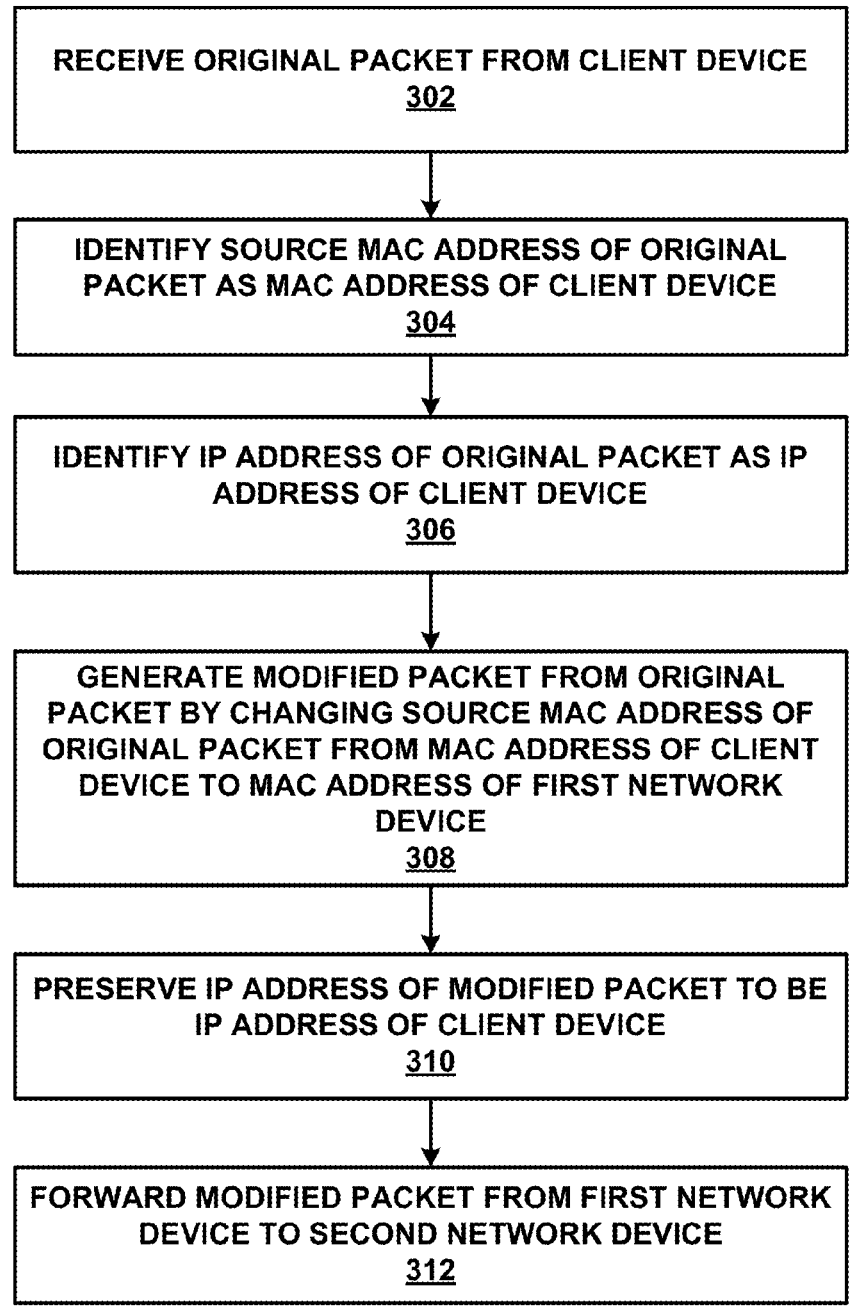
FIG. 3 illustrates an exemplary process for modifying a packet at a first network device according to embodiments of the present disclosure.

FIG. 3 is a flowchart illustrating an exemplary process 300 for modifying a packet at a first network device according to embodiments of the present disclosure. The communication module 220 receives an original packet from a client device 170 (operation 302). The traffic handling module 228 identifies a source MAC address of the original packet as the MAC address of the client device 170 (operation 304). The traffic handling module 228 identifies an IP address of the original packet as the IP address of the client device 170 (operation 306). For example, the traffic handling module 228 identifies a source IP address of the original packet as the IP address of the client device 170. The traffic handling module 228 generates a modified packet from the original packet at least by: changing the source MAC address of the original packet from the MAC address of the client device 170 to the MAC address of the first network device (operation 308). The traffic handling module 228 preserves the IP address of the modified packet to be the IP address of the client device 170 (operation 310). For example, the traffic handling module 228 preserves the source IP address of the modified packet as the IP address of the client device 170. The traffic handling module 228 forwards the modified packet from the first network device to the second network device (operation 312).

Figure 4:
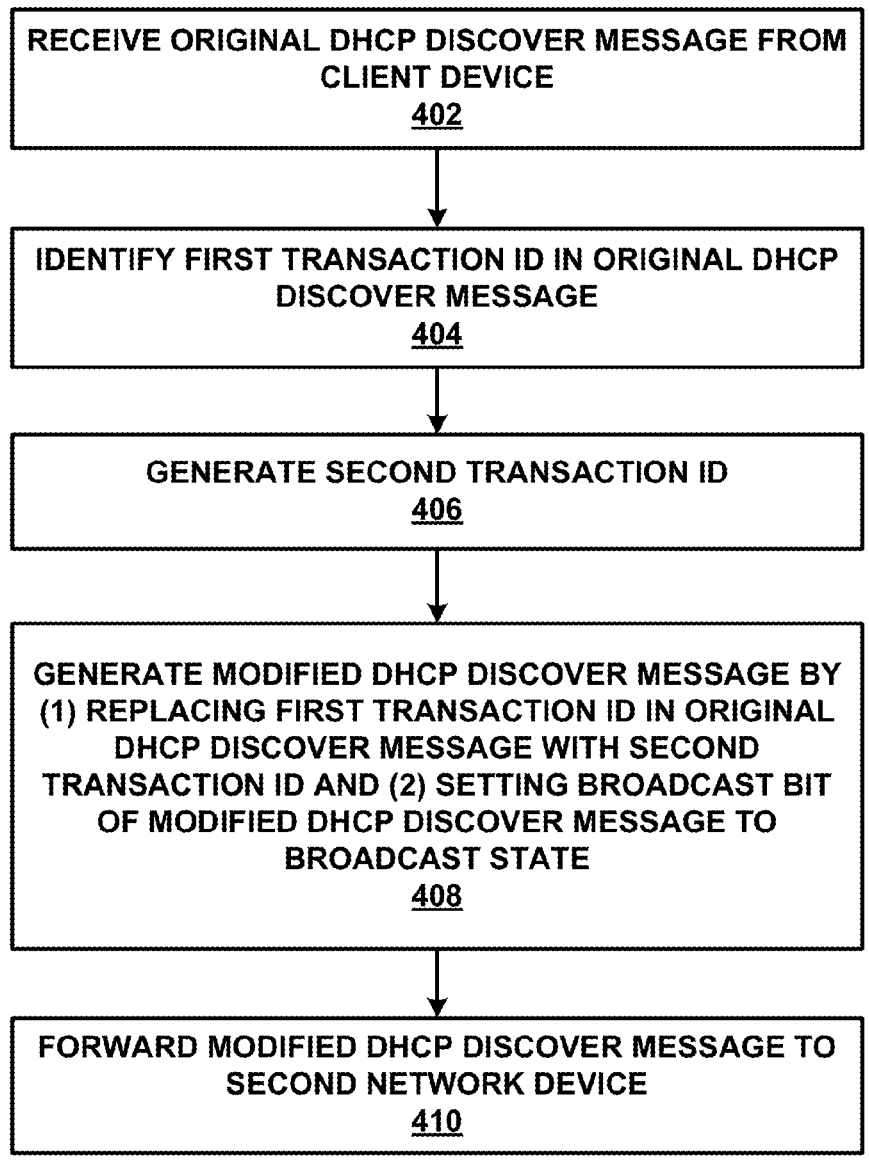
FIG. 4 illustrates an exemplary process for modifying a dynamic host configuration protocol (DHCP) discover message at a first network device according to embodiments of the present disclosure.

FIG. 4 is a flowchart illustrating an exemplary process 400 for modifying a DHCP discover message at a first network device according to embodiments of the present disclosure. The communication module 220 receives an original DHCP discover message from a client device 170 associated with the first network device (operation 402). The DHCP module 224 identifies a first transaction ID in the original DHCP discover message (operation 404). For example, the DHCP module 224 identifies an originator-XID from the original DHCP discover message. The DHCP module 224 generates a second transaction ID (operation 406). For example, the DHCP module 224 creates a generated-XID that corresponds to the originator-XID. The DHCP module 224 generates a modified DHCP discover message from the original DHCP discover message at least by: (1) replacing the first transaction ID in the original DHCP discover message with the second transaction ID; and (2) setting a broadcast bit of the modified DHCP discover message to a broadcast state (operation 408). The DHCP module 224 forwards the modified DHCP discover message to the second network device (operation 410).

Figure 5A:
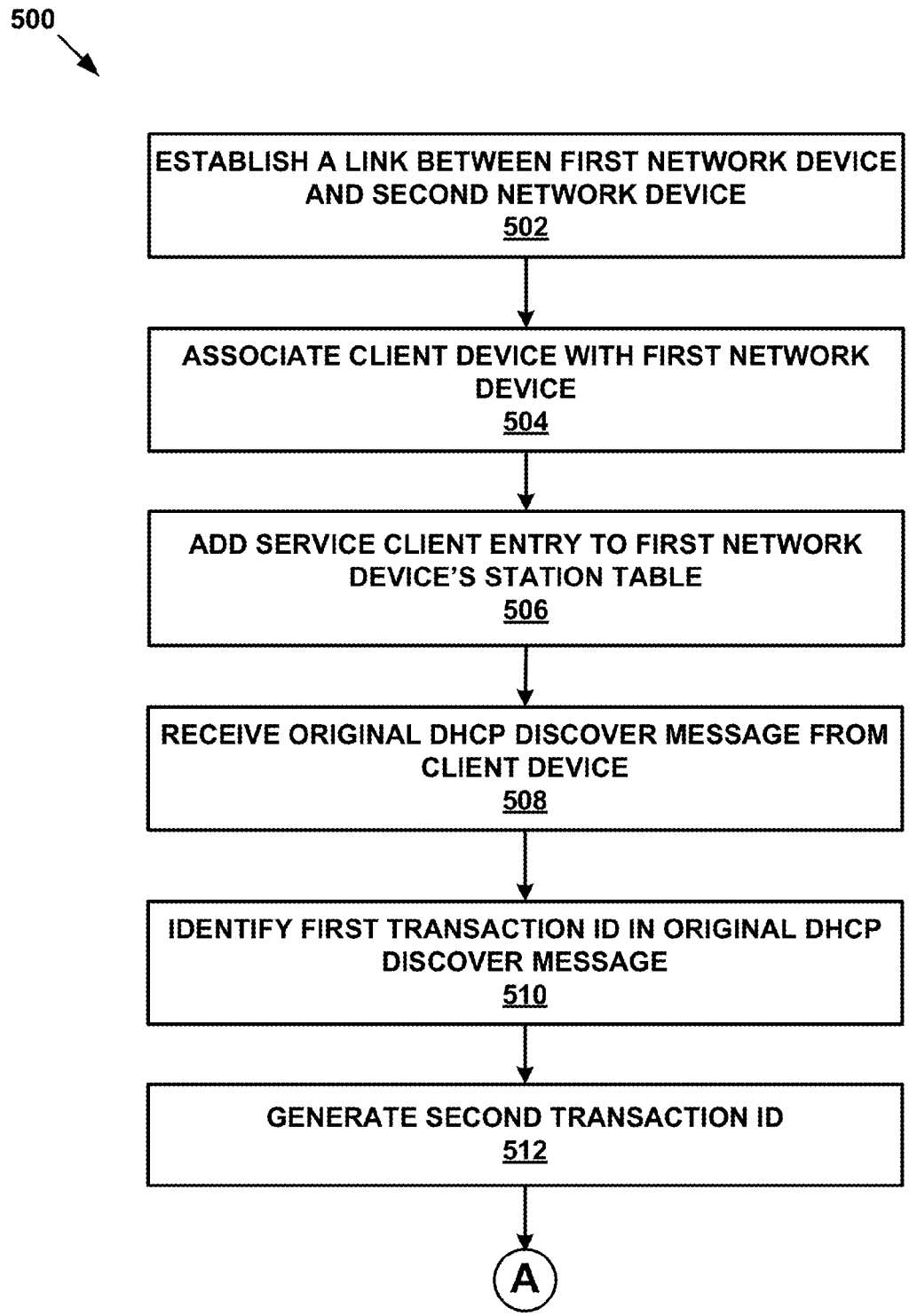
FIGS. 5A-5D illustrate an exemplary process for handling DHCP messages at a first network device according to embodiments of the present disclosure.

FIGS. 5A-5D are flowcharts illustrating an exemplary process 500 for handling DHCP messages at a first network device according to embodiments of the present disclosure. Referring to FIG. 5A, the association module 222 establishes a link between the first network device and a second network device (operation 502). The association module 222 associates a client device 170 with the first network device (operation 504). The association module 222 adds a service client entry to the first network device's station table (operation 506). The communication module 220 receives an original DHCP discover message from the client device 170 (operation 508). The DHCP module 224 identifies a first transaction ID (such as an originator-XID) in the original DHCP discover message (operation 510). The DHCP module 224 generates a second transaction ID such as a generated-XID (operation 512).

Figure 5B:
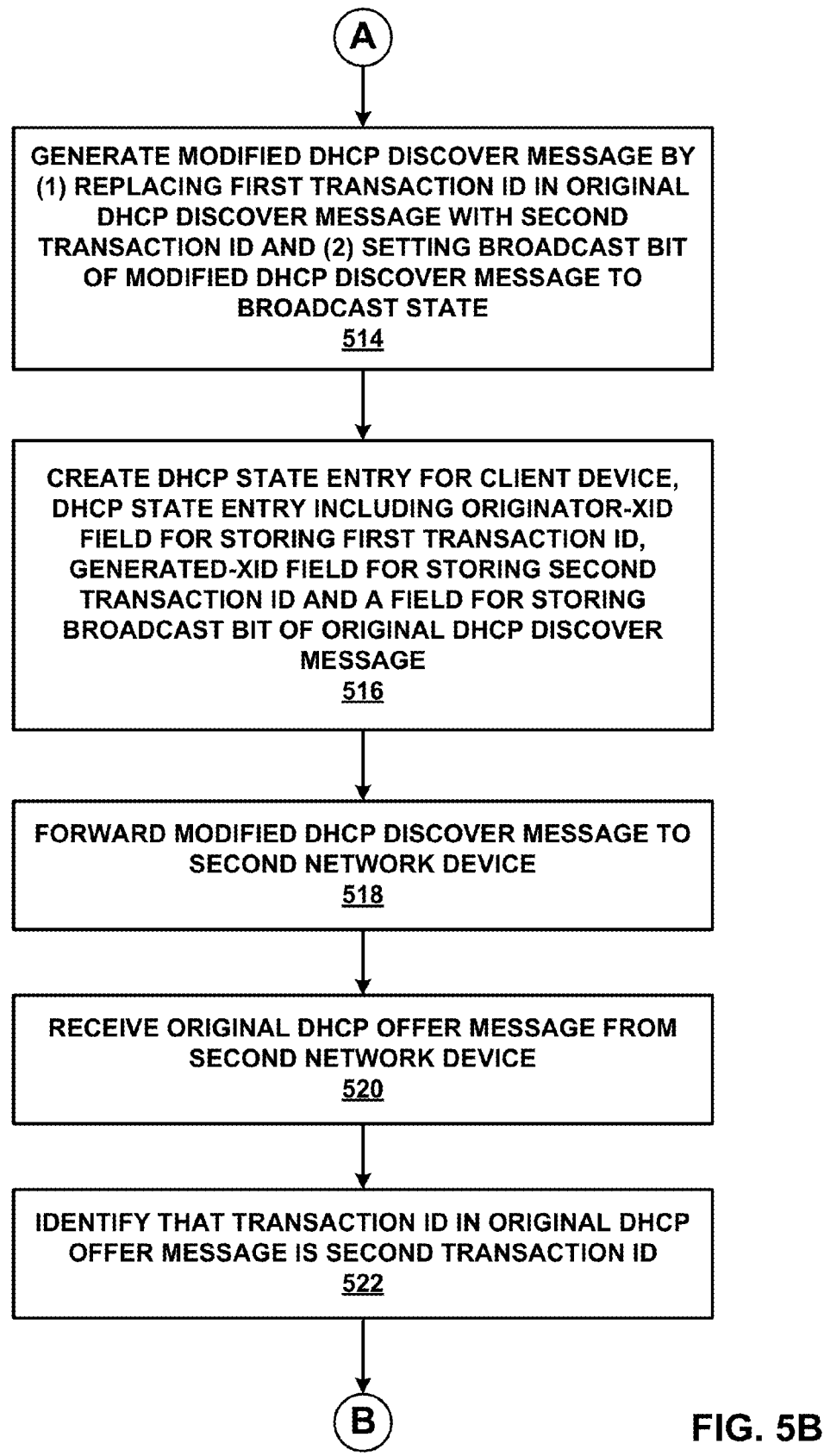

Referring to FIG. 5B, the DHCP module 224 generates a modified DHCP discover message from the original DHCP discover message at least by: (1) replacing the first transaction ID in the original DHCP discover message with the second transaction ID; and (2) setting a broadcast bit of the modified DHCP discover message to a broadcast state (operation 514). The DHCP module 224 creates a DHCP state entry for the client device 170 (operation 516), where the DHCP state entry includes an originator-XID field for storing the first transaction ID, a generated-XID field for storing the second transaction ID and/or a field for storing the broadcast bit of the original DHCP discover message, etc. In some examples, the DHCP state entry may include a client ID such as the MAC address of the client device 170. The DHCP module 224 forwards the modified DHCP discover message to the second network device (operation 518).

The second network device forwards the modified DHCP discover message to the distribution system 150, causing the distribution system 150 to generate an original DHCP offer message. The distribution system 150 sends the original DHCP offer message to a broadcast address. The second network device receives the original DHCP offer message and re-broadcasts it to all its clients including the first network device. The communication module 222 receives the original DHCP offer message from the second network device (operation 520). The DHCP module 224 identifies that a transaction ID in the original DHCP offer message is the second transaction ID (operation 522).

Figure 5C:
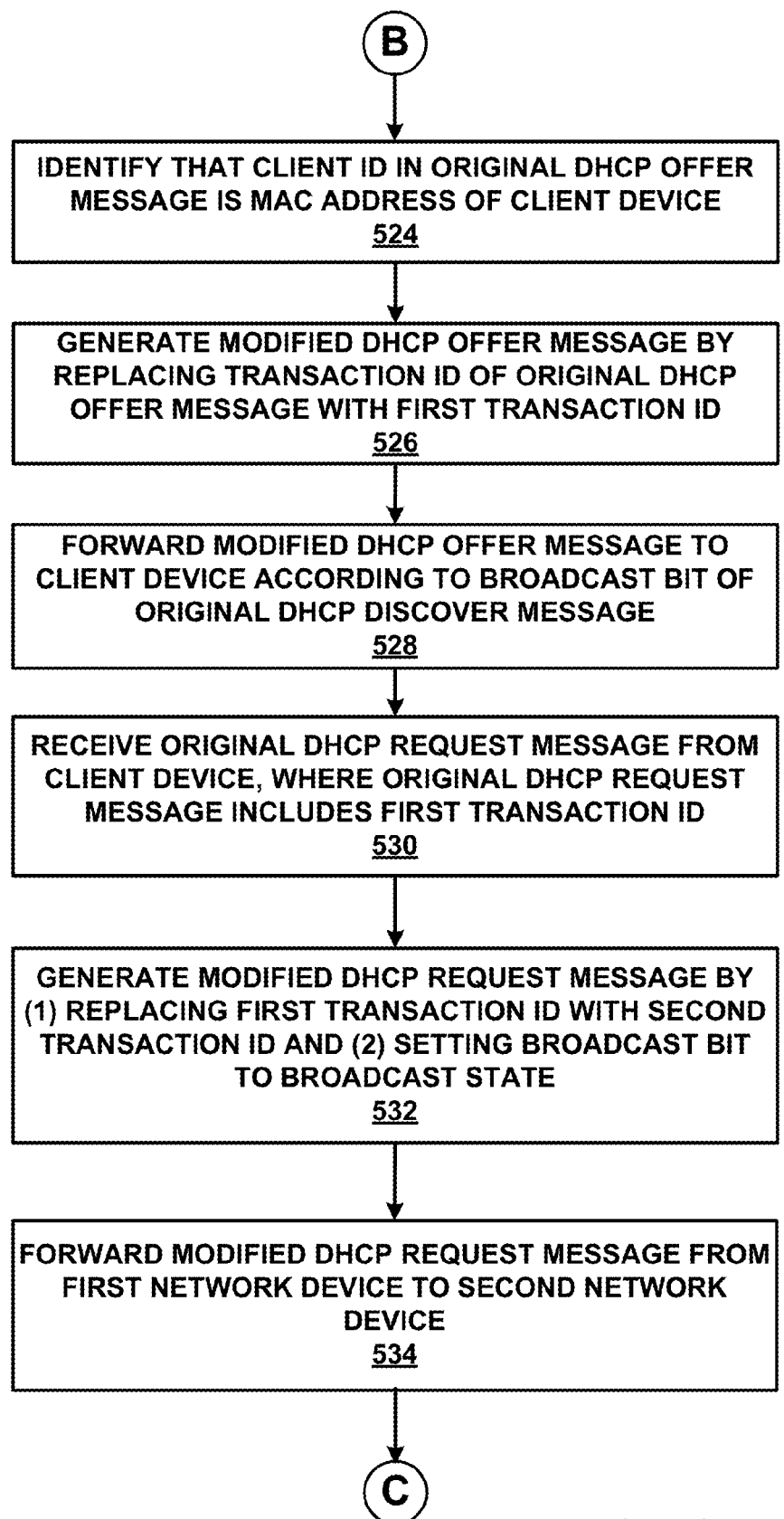

Referring to FIG. 5C, the DHCP module 224 identifies a client ID in the original DHCP offer message is the MAC address of the client device 170 (operation 524). For example, the DHCP module 224 identifies that the "chaddr" fields in the original DHCP offer message include the client device's MAC address. The DHCP module 224 determines that the original DHCP offer message is a message replying to the modified DHCP discover message based on operations 522 and 524. The DHCP module 224 generates a modified DHCP offer message from the original DHCP offer message at least by replacing the transaction ID of the original DHCP offer message with the first transaction ID (operation 526). The modified DHCP offer message is a message replying to the original DHCP discover message. The DHCP module 224 forwards the modified DHCP offer message to the client device 170 according to a broadcast bit of the original DHCP discover message (operation 528).

The client device 170 receives the modified DHCP offer message, and generates an original DHCP request message. The client device 170 sends the original DHCP request message to the first network device. The communication module 220 stored on the first network device receives the original DHCP request message from the client device 170 (operation 530). The original DHCP request message includes the first transaction ID. The DHCP module 224 generates a modified DHCP request message from the original DHCP request message at least by: (1) replacing the first transaction ID in the original DHCP request message with the second transaction ID; and (2) setting a broadcast bit in the modified DHCP request message to a broadcast state (operation 532). The DHCP module 224 forwards the modified DHCP request message from the first network device to the second network device (operation 534). The second network device forwards the modified DHCP request message to the distribution system 150, causing the distribution system 150 to generate an original DHCP ACK message. The distribution system 150 sends the original DHCP ACK message to a broadcast address. The second network device receives the original DHCP ACK message and re-broadcasts it to all its clients including the first network device.

Figure 5D:
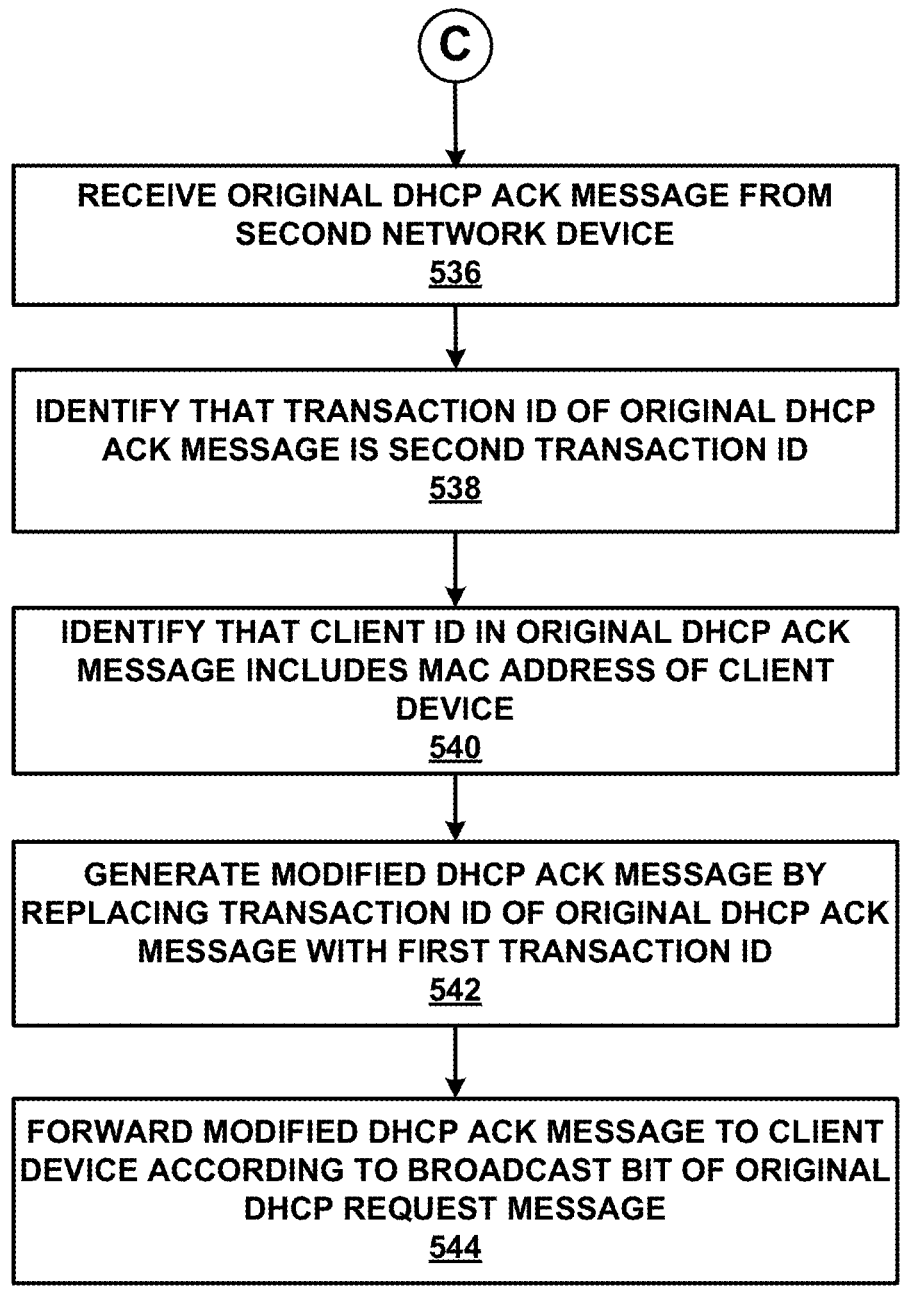

Referring to FIG. 5D, the communication module 222 receives the original DHCP ACK message from the second network device (operation 536). The DHCP module 224 identifies that a transaction ID in the original DHCP ACK message is the second transaction ID (operation 538). The DHCP module 224 identifies a client ID in the original DHCP ACK message is the MAC address of the client device 170 (operation 540). For example, the DHCP module 224 identifies that the "chaddr" fields in the original DHCP ACK message include the client device's MAC address. The DHCP module 224 determines that the original DHCP ACK message is a message replying to the modified DHCP request message based on operations 538 and 540. The DHCP module 224 generates a modified DHCP ACK message from the original DHCP ACK message at least by replacing the transaction ID of the original DHCP ACK message with the first transaction ID (operation 542). The modified DHCP ACK message is a message replying to the original DHCP request message. The DHCP module 224 forwards the modified DHCP ACK message to the client device 170 according to a broadcast bit of the original DHCP request message (operation 544). After receiving the modified DHCP ACK message, the client device 170 is allocated with a unique IP address. The DHCP module 224 also updates the IP address in the service client entry associated with the client device 170.

Figure 6:
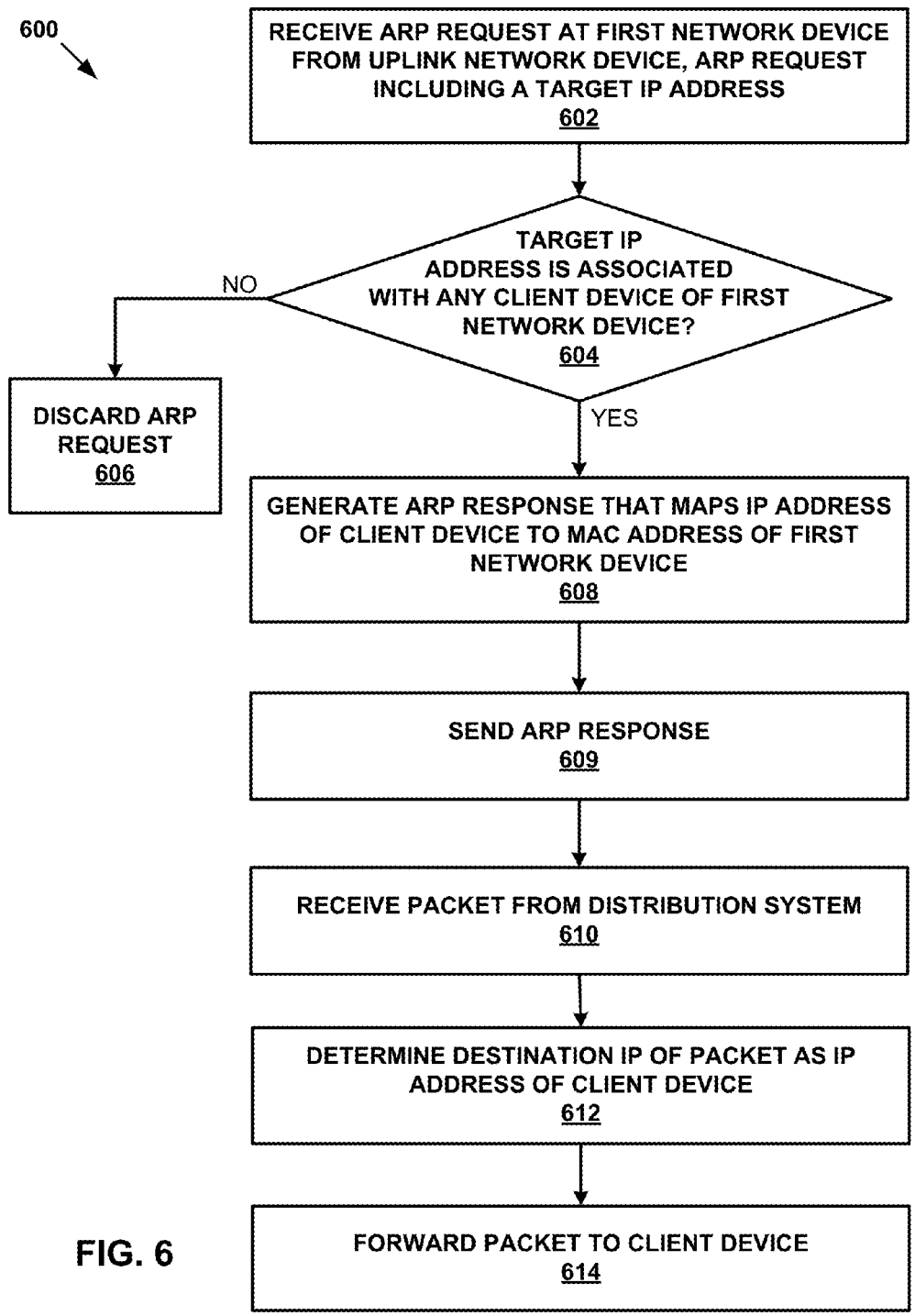
FIG. 6 illustrates an exemplary process for performing a proxy address resolution protocol (ARP) function at a first network device according to embodiments of the present disclosure.

FIG. 6 is a flowchart illustrating an exemplary process 600 for performing a proxy ARP function at a first network device according to embodiments of the present disclosure. The communication module 220 receives an ARP request at the first network device from an uplink network device (operation 602). The ARP request includes a target IP address. The ARP module 226 determines whether the target IP address is associated with any client device 170 of the first network device (operation 604). If the target IP address is not associated with any client device 170 of the first network device, the ARP request discards the ARP request (operation 606). However, if the target IP address is associated with a client device 170 of the first network device, the ARP module 226 generates an ARP response that maps the target IP address to the MAC address of the first network device (operation 608). For example, if the target IP address is the same as the IP address of the client device 170, the ARP module 226 generates an ARP response that maps the IP address of the client device 170 to the MAC address of the first network device.

The ARP module 226 sends the ARP response to the distribution system 150 via the uplink access point 160 (operation 609). The distribution system 150 can use the mapping relationship between the IP address of the client device 170 and the MAC address of the first network device to send packets to the client device 170 via the first network device. For example, any packets sent to the IP address of the client device 170 are sent to the first network device, and the first network device relays the packets to the client device 170. In some embodiments, the communication module 220 stored in the first network device receives a packet from the distribution system 150 (operation 610). The traffic handling module 228 determines that a destination IP address in the packet is the IP address of the client device 170 (operation 612). The traffic handling module 228 forwards the packet to the client device 170 (operation 614).

Figure 7A:
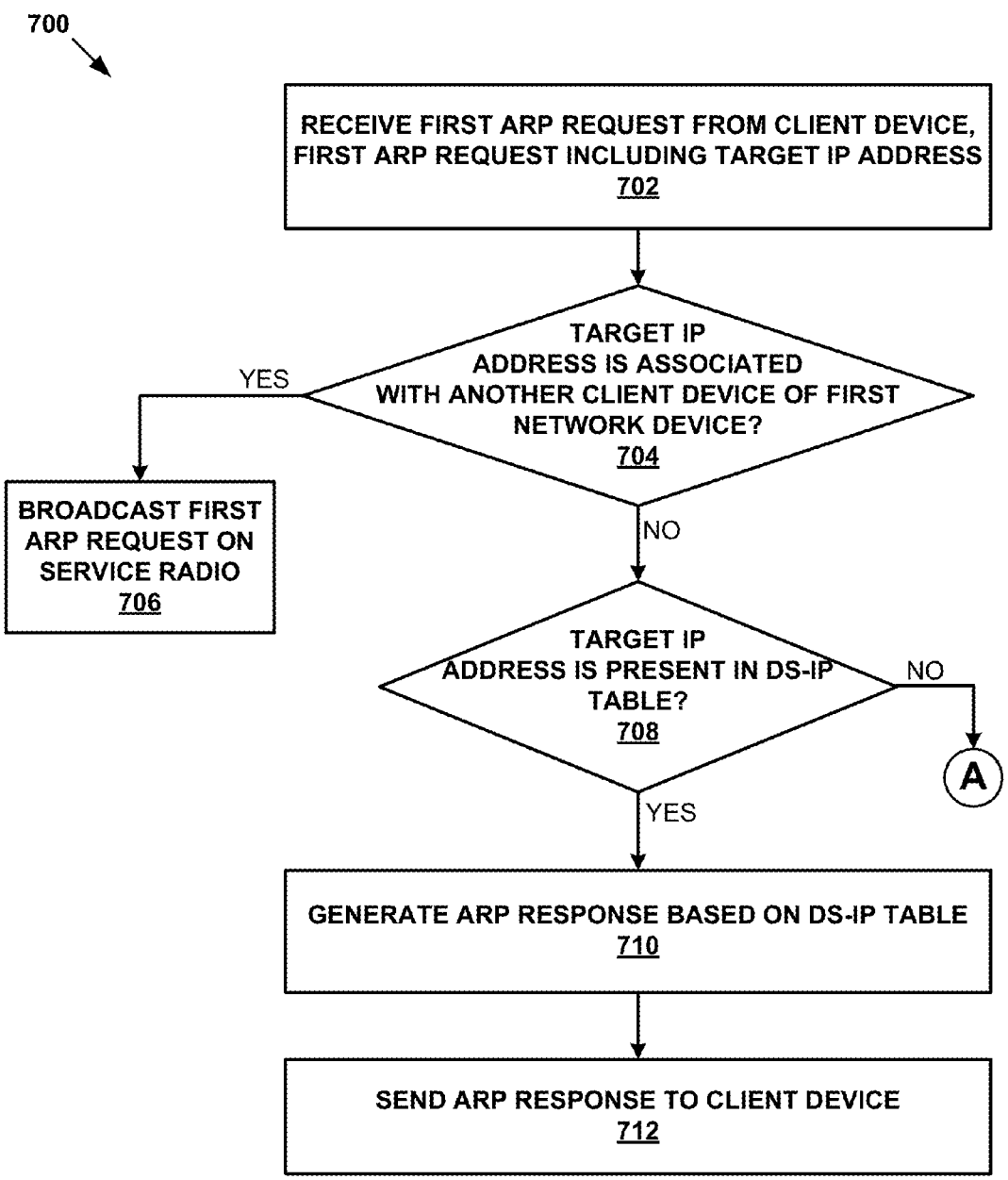
FIGS. 7A and 7B illustrate an exemplary process for performing ARP forwarding at a first network device according to embodiments of the present disclosure.
Figure 7B:
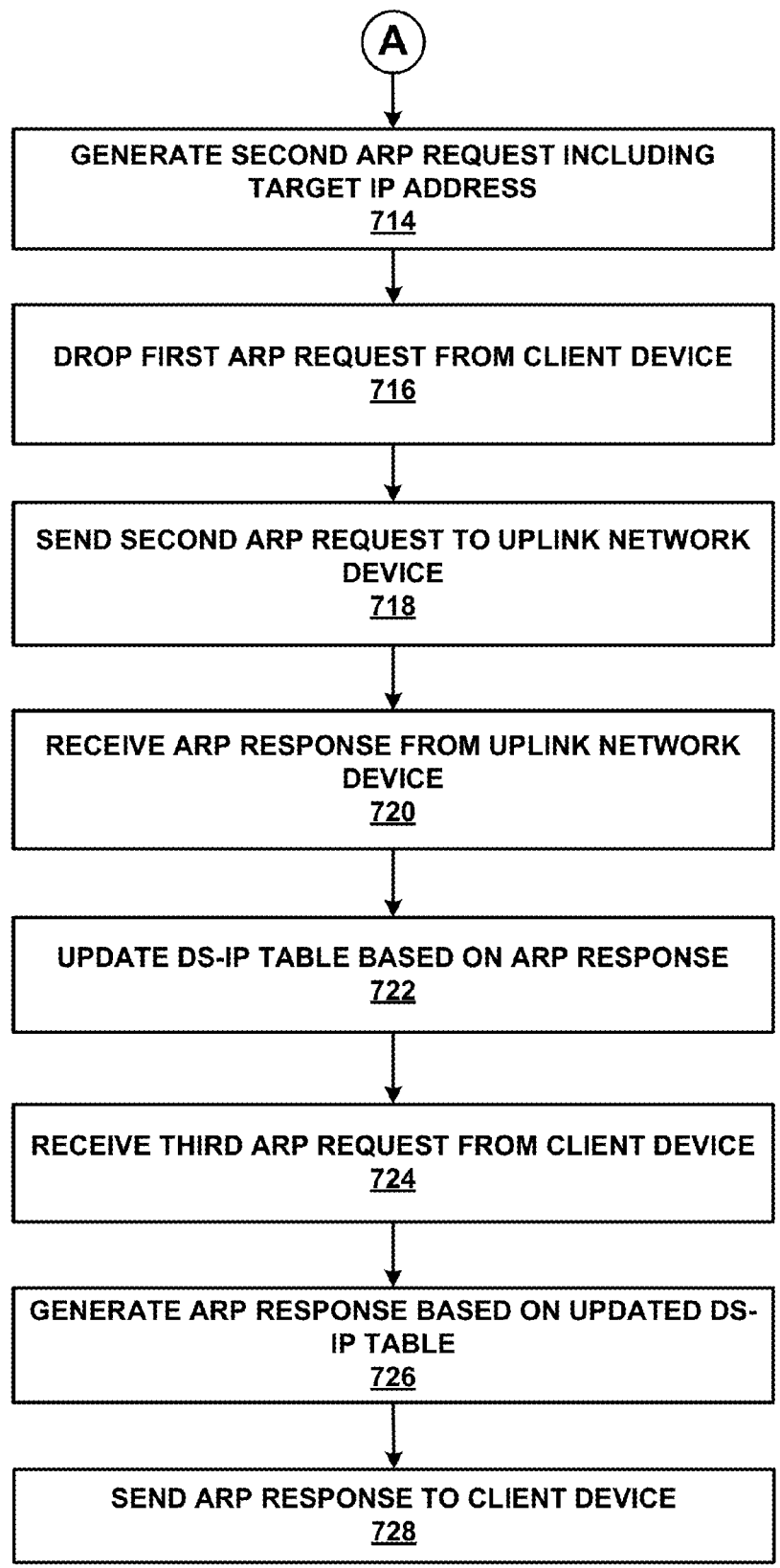

FIGS. 7A and 7B are flowcharts illustrating an exemplary process 700 for performing ARP forwarding at a first network device according to embodiments of the present disclosure. Referring to FIG. 7A, the communication module 220 receives a first ARP request from a client device 170 associated with the first network device (operation 702). The first ARP request includes a target IP address. The ARP module 226 determines whether the target IP address is associated with another client device 170 of the first network device (operation 704). For example, the ARP module 226 determines whether the target IP address is an IP address of another client device 170 associated with the first network device. If the target IP address is associated with another client device 170, the ARP module 226 broadcasts the first ARP request on the service radio of the first network device (operation 706). The other client device 170 associated with the target IP address receives the first ARP request as a broadcast message, generates an ARP response replying to the first ARP request and sends the ARP response to the client device 170 that generates the first ARP request. The ARP response maps the target IP address, which is also the other client device's IP address, to the other client device's MAC address.

If the target IP address is not associated with any client device 170 of the first network device, the ARP module 226 determines whether the target IP address is present in a DS-IP table (operation 708). If the target IP address is present in the DS-IP table, the exemplary process 700 moves to operation 710. Otherwise, the exemplary process 700 moves to operation 714. At operation 710, the ARP module 226 generates an ARP response based on the DS-IP table. For example, the ARP module 226 generates an ARP response that includes an entry from the DS-IP table, where the entry maps the target IP address to an MAC address of a host device in the distribution system 150. The ARP module 226 sends the ARP response to the client device 170 (operation 712).

Referring to FIG. 7B, if the target IP address is not present in the DS-IP table, the ARP module 226 generates a second ARP request including the target IP address (operation 714). The ARP module 226 drops the first ARP request received from the client device 170 (operation 716). The ARP module 226 sends the second ARP request to the uplink network device (operation 718). The uplink network device forwards the ARP request to the distribution system 150. A host device in the distribution system 150, which is associated with the target IP address, generates an ARP response mapping the target IP address to the host device's MAC address. The host device broadcasts the ARP response in the network. The uplink network device receives the ARP response as a broadcast message and re-broadcasts the ARP response to its client devices 170 including the first network device.

The communication module 220 stored on the first network device receives the ARP response from the uplink network device (operation 720). The ARP module 226 updates the DS-IP table based on the ARP response (operation 722). For example, the ARP module 226 adds an entry to the DS-IP table, where the entry describes the mapping between the target IP address and the MAC address of the host device. The communication module 220 receives a third ARP request from the client device 170 (operation 724). The third ARP request includes the same target IP address. The ARP module 226 generates an ARP response based on the updated DS-IP table (operation 726). The ARP response includes data describing a mapping between the target IP address and the host device's MAC address. The ARP module 226 sends the ARP response to the client device 170 (operation 728).

Figure 8:
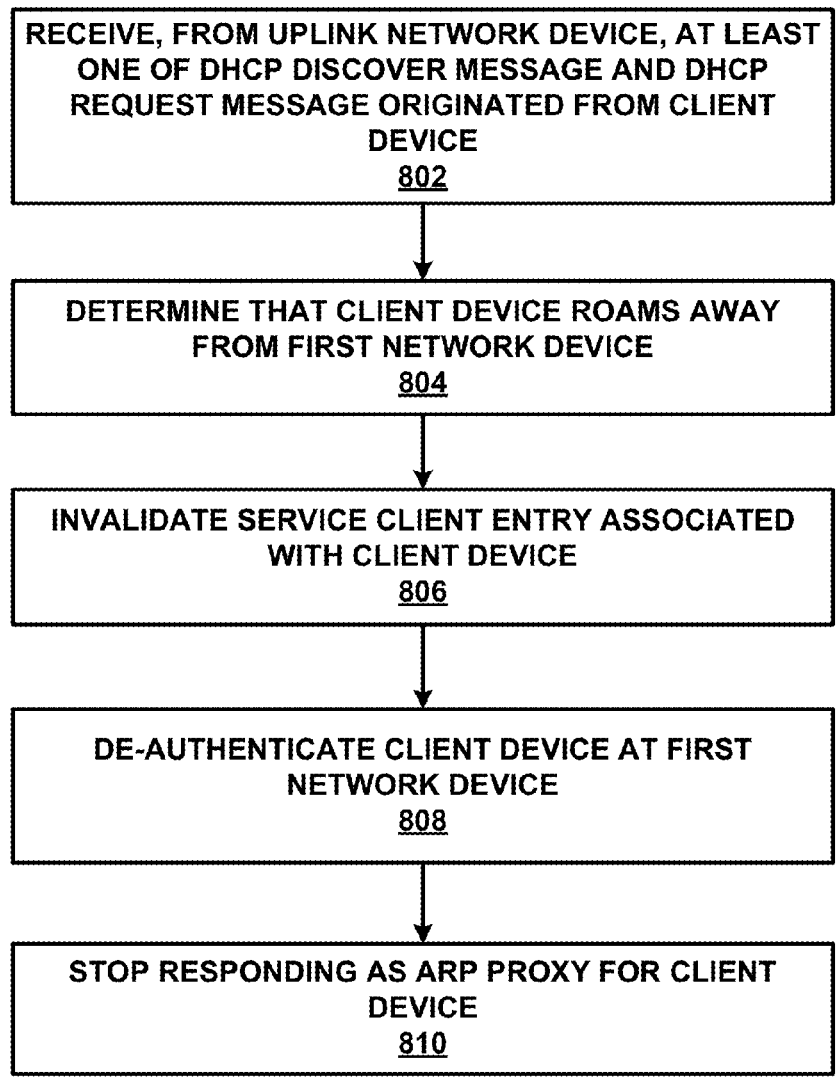
FIG. 8 illustrates an exemplary process for handling roaming of client devices according to embodiments of the present disclosure.

FIG. 8 is a flowchart illustrating an exemplary process 800 for handling roaming of client devices 170 associated with the first network device according to embodiments of the present disclosure. The communication module 220 receives, from an uplink network device via an uplink radio, at least one of a DHCP discover message and a DHCP request message originated from a client device 170 associated with the first network device (operation 802). The roaming module 230 determines that the client device 170 roams away from the first network device responsive to receiving the DHCP discover message and/or DHCP request message from the uplink network device (operation 804). The roaming module 230 invalidates a service client entry associated with the client device 170 (operation 806). The roaming module 230 de-authenticates the client device 170 at the first network device (operation 808). The roaming module 230 stops responding as an ARP proxy for the client device 170 (operation 810).

Graphic Representations

FIG. 9A is a graphic representation 900 illustrating an exemplary service client entry associated with a client device 170. The exemplary service client entry includes, for example, the MAC address of the client device 170, an encryption key and/or an IP address of the client device 170, etc. The exemplary service client entry may include other data associated with the client device 170.

FIG. 9B is a graphic representation 950 illustrating an exemplary DHCP state entry associated with a client device 170. The exemplary DHCP state entry includes, for example, an originator-XID, a generated-XID and/or a broadcast bit of an original DHCP discover message or an original DHCP request message originated from the client device 170, etc. The DHCP state entry may include other data associated with the client device 170 such as the MAC address of the client device 170.

Event Diagram for Handling DHCP Messages

Figure 10:
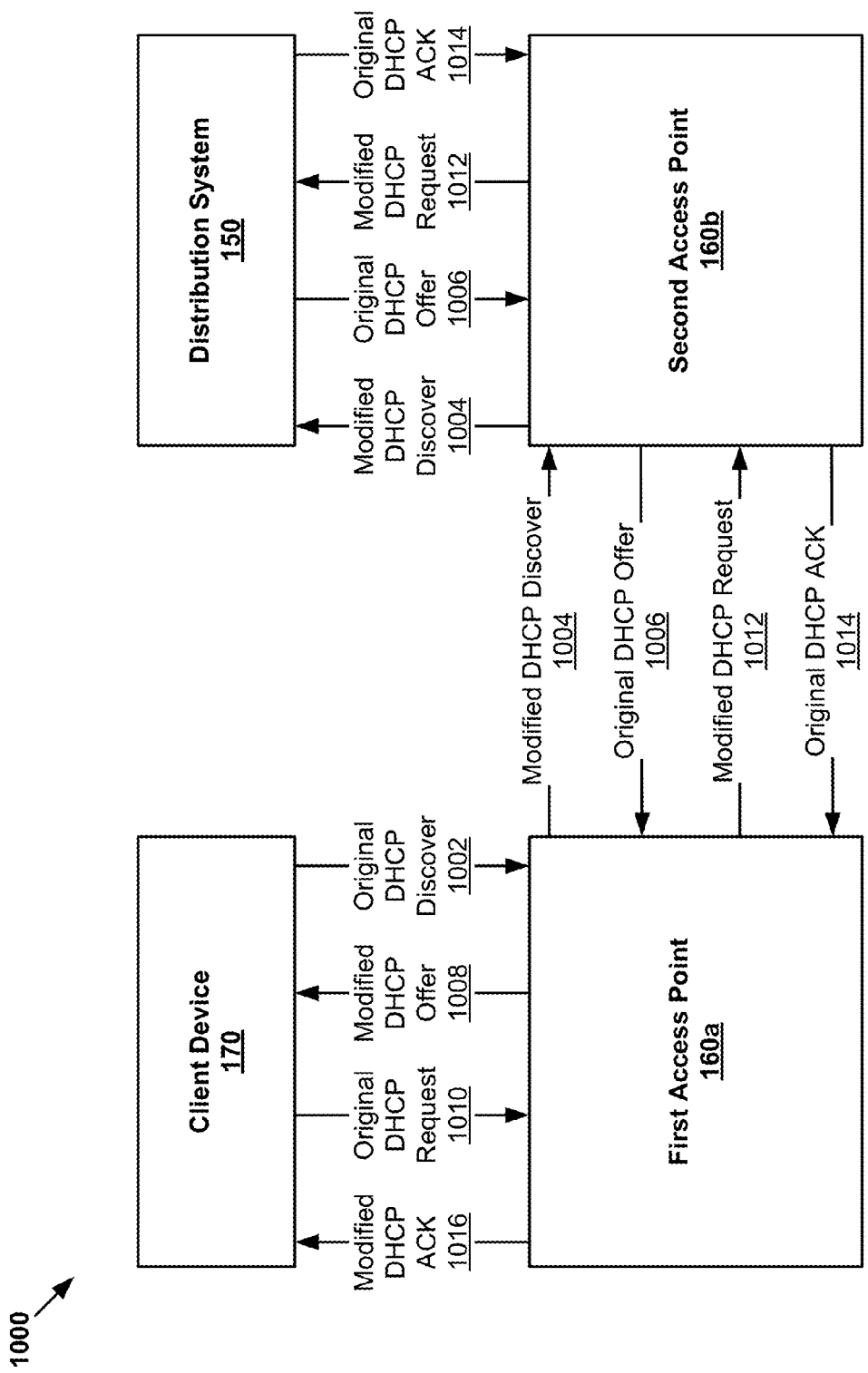
FIG. 10 is an event diagram illustrating an exemplary process for handling DHCP messages according to embodiments of the present disclosure.

FIG. 10 is an event diagram illustrating an exemplary process 1000 for handling DHCP messages according to embodiments of the present disclosure. A client device 170 associated with a first access point 160*a* generates an original DHCP discover message 1002 and sends the original DHCP discover message 1002 to the first access point 160*a*. The first access point 160*a* does not have Ethernet connection to the distribution system 150. The first access point 160*a* is wirelessly connected to a second access point 160*b* that has Ethernet connection to the distribution system 150. The first access point 160*a* modifies the original DHCP discover message 1002 to generate a modified DHCP discover message 1004, and sends the modified DHCP discover message 1004 to the second access point 160*b*. The second access point 160*b* forwards the modified DHCP discover message 1004 to the distribution system 150. The distribution system 150 generates an original DHCP offer message 1006 and sends the original DHCP offer message 1006 to the second access point 106*b*, causing the second access point 160*b* to forward the original DHCP offer message 1006 to the first access point 160*a*. The first access point 160*a* modifies the original DHCP offer message 1006 to generate a modified DHCP offer message 1008, and sends the modified DHCP offer message 1008 to the client device 170.

The client device 170 receives the modified DHCP offer message 1008, and generates an original DHCP request message 1010. The client device 170 sends the original DHCP request message 1010 to the first access point 160*a*. The first access point 160*a* modifies the original DHCP request message 1010 to generate a modified DHCP request message 1012, and sends the modified DHCP request message 1012 to the second access point 160*b*. The second access point 160*b* forwards the modified DHCP request message 1012 to the distribution system 150. The distribution system 150 generates an original DHCP ACK message 1014 and sends the original DHCP ACK message 1014 to the second access point 106*b*, causing the second access point 160*b* to forward the original DHCP ACK message 1014 to the first access point 160*a*. The first access point 160*a* modifies the original DHCP ACK message 1014 to generate a modified DHCP ACK message 1016, and sends the modified DHCP ACK message 1016 to the client device 170. At the completion of the DHCP handshake process, the client device 170 is allocated with a unique IP address.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "digital device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Input/output or I/O devices (including but not limited to keyboards, displays, pointing devices, etc.) can be coupled to the system either directly or through intervening I/O controllers.

The particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A system comprising:
a processor; and
a memory storing instructions that, when executed, cause the system to:
receive, at a first network device, an original DHCP discover message from a client device;
identify a first transaction ID in the original DHCP discover message;
generate a second transaction ID;
generate a modified DHCP discover message from the original DHCP discover message by:
replacing the first transaction ID in the original DHCP discover message with the second transaction ID; and
setting a broadcast bit of the modified DHCP discover message to a broadcast state; and
forward the modified DHCP discover message from the first network device to a second network device.

2. The system of claim 1, wherein the first and second network devices are access points, and the second network device is connected to a distribution system via a wired Ethernet connection.

3. The system of claim 1, wherein the instructions when executed cause the system to also:
create a DHCP state entry for the client device, wherein the DHCP state entry includes an originator-XID field for storing the first transaction ID, a generated-XID field for storing the second transaction ID and a field for storing a broadcast bit of the original DHCP discover message.

4. The system of claim 1, wherein the instructions when executed cause the system to also:
receive, at the first client device, an original DHCP offer message from the second network device;
identify that a transaction ID of the original DHCP offer message is the second transaction ID;
identify that a client ID in the original DHCP offer message is a MAC address of the client device;
generate a modified DHCP offer message from the original DHCP offer message by replacing the transaction ID of the original DHCP offer message with the first transaction ID; and
forward the modified DHCP offer message to the client device according to a broadcast bit of the original DHCP discover message.

5. The system of claim 4, wherein the instructions when executed cause the system to also:
receive, at the first network device, an original DHCP request message from the client device, the original DHCP request message including the first transaction ID;
generate a modified DHCP request message from the original DHCP request message by:
replacing the first transaction ID in the original DHCP request message with the second transaction ID; and
setting a broadcast bit of the modified DHCP request message to the broadcast state; and
forward the modified DHCP request message from the first network device to a second network device.

6. The system of claim 5, wherein the instructions when executed cause the system to also:
receive, at the first client device, an original DHCP acknowledgement message from the second network device;
identify that a transaction ID of the original DHCP acknowledgement message is the second transaction ID;
identify that a client ID in the original DHCP acknowledge message is the MAC address of the client device;
generate a modified DHCP acknowledgement message from the original DHCP acknowledgement message by replacing the transaction ID of the original DHCP acknowledgement message with the first transaction ID; and
forward the modified DHCP acknowledgement message to the client device according to a broadcast bit of the original DHCP request message.

7. The system of claim 6, wherein the instructions when executed cause the system to also:
receive an ARP request from the second network device;
determine that the ARP request includes an IP address of the client device; and
generate an ARP response that maps the IP address of the client device to a MAC address of the first network device.

8. The system of claim 1, wherein the instructions when executed cause the system to also:
detect a removal of the client device from the first network device; and
deactivate service for the client device from the first network device.

9. A non-transitory computer-readable storage medium storing embedded instructions for a plurality of operations that are executed by one or more mechanisms implemented within one or more network devices, the plurality of operations comprising:
receiving, at a first network device, an original DHCP discover message from a client device;
identifying a first transaction ID in the original DHCP discover message;
generating a second transaction ID;
generating a modified DHCP discover message from the original DHCP discover message by:
replacing the first transaction ID in the original DHCP discover message with the second transaction ID; and
setting a broadcast bit of the modified DHCP discover message to a broadcast state; and
forwarding the modified DHCP discover message from the first network device to a second network device.

10. The computer-readable storage medium of claim 9, wherein the first and second network devices are access points, and the second network device is connected to a distribution system via a wired Ethernet connection.

11. The computer-readable storage medium of claim 9, wherein the plurality of operations further comprises:
creating a DHCP state entry for the client device, wherein the DHCP state entry includes an originator-XID field for storing the first transaction ID, a generated-XID field for storing the second transaction ID and a field for storing a broadcast bit of the original DHCP discover message.

12. The computer-readable storage medium of claim 9, wherein the plurality of operations further comprises:
    receiving, at the first client device, an original DHCP offer message from the second network device;
    identifying that a transaction ID of the original DHCP offer message is the second transaction ID;
    identifying that a client ID in the original DHCP offer message is a MAC address of the client device;
    generating a modified DHCP offer message from the original DHCP offer message by replacing the transaction ID of the original DHCP offer message with the first transaction ID; and
    forwarding the modified DHCP offer message to the client device according to a broadcast bit of the original DHCP discover message.

13. The computer-readable storage medium of claim 12, wherein the plurality of operations further comprises:
    receiving, at the first network device, an original DHCP request message from the client device, the original DHCP request message including the first transaction ID;
    generating a modified DHCP request message from the original DHCP request message by:
        replacing the first transaction ID in the original DHCP request message with the second transaction ID; and
        setting a broadcast bit of the modified DHCP request message to the broadcast state; and
    forwarding the modified DHCP request message from the first network device to a second network device.

14. The computer-readable storage medium of claim 13, wherein the plurality of operations further comprises:
    receiving, at the first client device, an original DHCP acknowledgement message from the second network device;
    identifying that a transaction ID of the original DHCP acknowledgement message is the second transaction ID;
    identifying that a client ID in the original DHCP acknowledge message is the MAC address of the client device;
    generating a modified DHCP acknowledgement message from the original DHCP acknowledgement message by replacing the transaction ID of the original DHCP acknowledgement message with the first transaction ID; and
    forwarding the modified DHCP acknowledgement message to the client device according to a broadcast bit of the original DHCP request message.

15. The computer-readable storage medium of claim 14, wherein the plurality of operations further comprises:
    receiving an ARP request from the second network device;
    determining that the ARP request includes an IP address of the client device; and
    generating an ARP response that maps the IP address of the client device to a MAC address of the first network device.

\* \* \* \* \*